April 24, 1928.
H. A. ZWEIG
ELECTRIC POLISHER
Filed Sept. 4, 1926
1,667,579
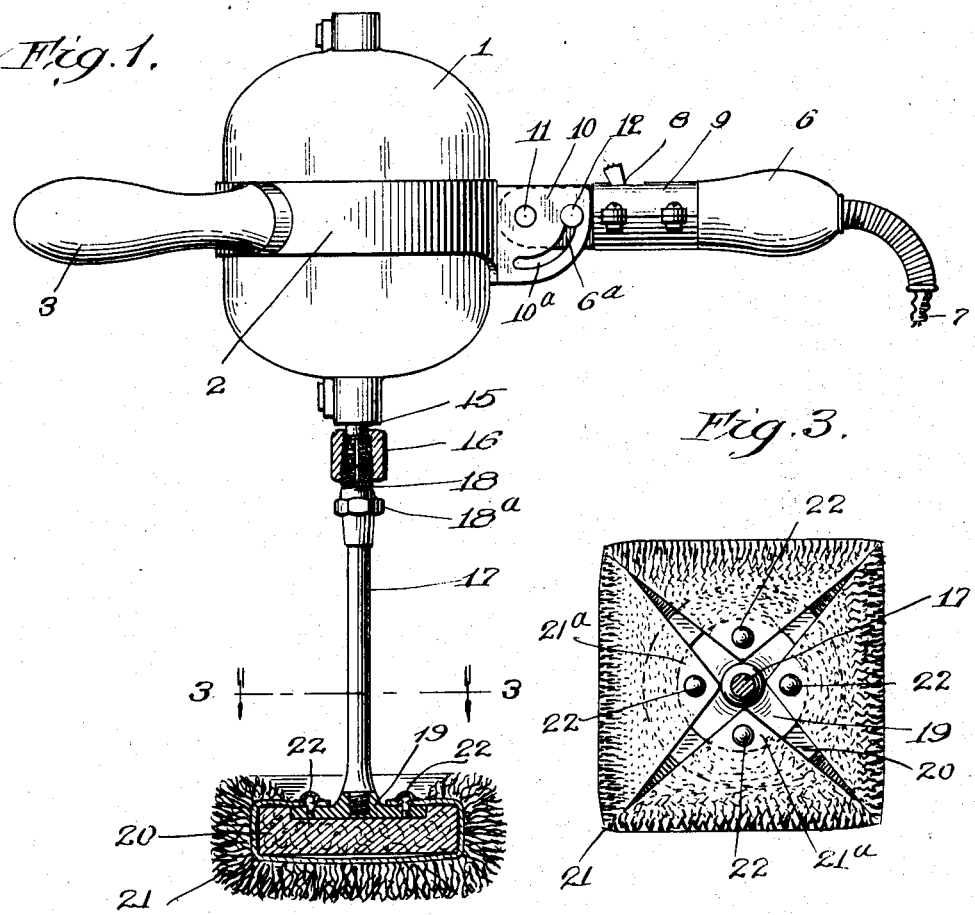
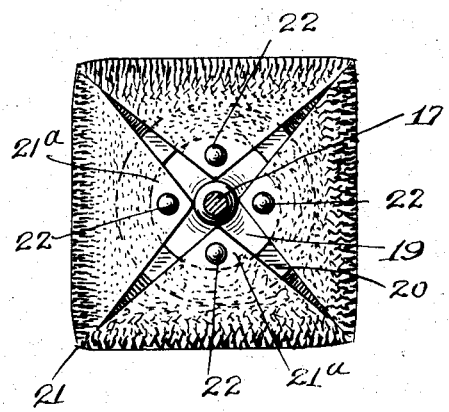
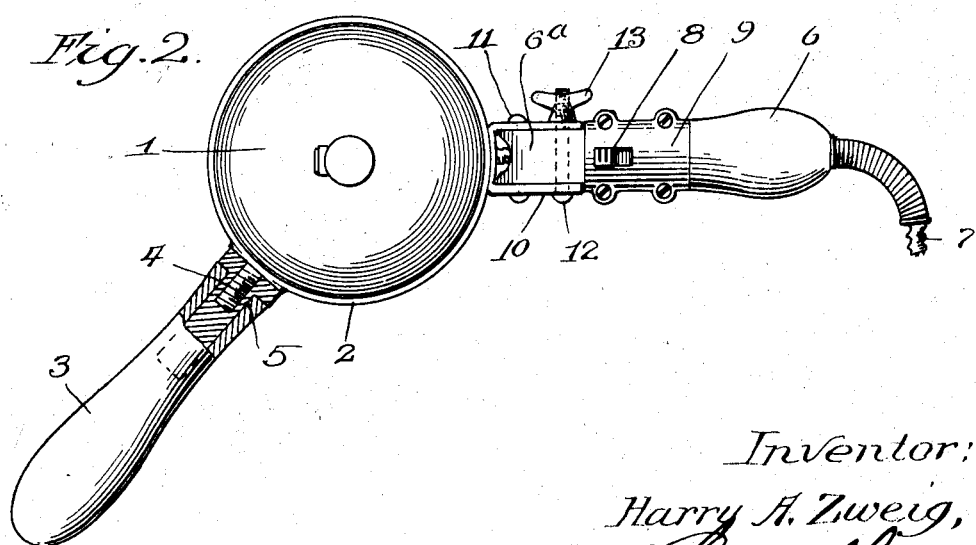
Inventor:
Harry A. Zweig,
by Charles O. Hurry
his Atty.

Patented Apr. 24, 1928.

1,667,579

UNITED STATES PATENT OFFICE.

HARRY A. ZWEIG, OF CHICAGO, ILLINOIS.

ELECTRIC POLISHER.

Application filed September 4, 1926. Serial No. 133,520.

This invention relates to electric polishers, and its principal object is to provide a simple, efficient, and handy motor driven tool or implement for use in cleaning and polishing the surfaces of automobiles, furniture, store fixtures and in fact all analogous articles having surfaces requiring cleaning and polishing. Another object of the invention is to provide a portable, electric motor operated, polishing implement, with a pair of handles, whereby it may be easily manipulated, one of the handles being preferably removable and the other being angularly adjustable with respect to the longitudinal axis of the motor, whereby the device may be reduced to a compact form for shipment or storage in a carton or other container. Another object is to provide an electric motor with one, or a pair of handles, and with a relatively soft, pliable, polishing member, such as sheep skin, for attachment to an extension of the motor shaft such as a spindle. Another object is to provide a sheep skin polishing member, which may be folded along approximately straight lines about a pliable pad so as to present approximately straight edges, and having fastening means for readily attaching and detaching the polishing member to and from the pad. Other objects and advantages will appear in the course of this specification, and with said objects and advantages in view, this invention consists in the several novel features hereinafter fully set forth and claimed.

The invention is clearly illustrated in the drawing accompanying this specification, in which:

Fig. 1 is a side elevation, with certain parts broken out, of an electric polisher embodying a simple form of the present invention; Fig. 2 is a plan thereof, with a certain part broken out and Fig. 3 is a view partly in plan and partly in horizontal section thereof, the line of section being taken at 3—3 in Fig. 1.

Referring to said drawing, which illustrates a simple embodiment of the present invention, the reference character 1 designates a portable electric motor of convenient size and weight for handling, and of relatively low horse power. Secured to and projecting from the side of the casing of the motor are handles 3, 6, which project radially from the motor and are angularly disposed with respect to each other, being placed at a suitable angle whereby both of them may be taken hold of conveniently for the purpose of manipulating the device. As of preference, the handles are secured to a band 2, which surrounds and is secured to the casing of the motor in any suitable manner, and as a preference one of the handles 3 is removably secured to said casing, it being here shown as provided with a threaded socket member 5 threadedly secured upon a threaded stud, or screw, 4, which is secured to and projects from the band 2. The handle 3 may be wholly disconnected from the motor whenever desired or necessary. The handle 6 is also secured to the band 2 and if desired may be pivoted thereto on an axis extending at right angles to the longitudinal axis of the motor whereby the handle 6 may be adjusted angularly with respect to the said axis for the purpose of obtaining compactness and also for the purpose of enabling the user to hold the device more conveniently in reaching certain otherwise inaccessible portions of an article which is to be polished. The handle 6 contains an electric switch 8, which is interposed in the electric conductors 7 that extend through the handle and run to the motor 1. If desired the switch 8 may be covered by a two piece bakelite covering 9, which may be secured upon the handle 6 and around the switch. The electric cords or conductors 7 should be of convenient length and provided with a plug (not shown) whereby electric connection may be made with an electric socket of the usual house wiring. In the form of the invention illustrated, a forked bracket 10 is provided, which is secured to the band 2 in any suitable manner, and the portion 6ª of the handle is placed between the forks of the bracket and pivotally secured thereto by a rivet, screw or other pivotal connecting member 11. A clamp bolt 12 extends through arcuate slots 10ª in the forks of the bracket 10 and through the part 6ª of the handle and has a thumb or wing nut 13 threadedly secured upon the threaded end of the bolt 12 and furnishes means for securing the handle 6 upon the motor in any angular position of adjustment with respect thereto.

Upon the motor shaft 15 of the motor is secured a spindle 17, which carries upon its free end the polishing member 21. One end of said spindle 17 is formed with a tapered, threaded, split end 18, which is arranged to receive a lock nut 16, and said tapered end of the spindle is formed with a socket for the reception of the motor shaft 15. Adjacent to the tapered end, the spindle is made hexangular or non-circular in form for the reception of a wrench. The spindle 17 is secured to the motor shaft 15 by placing the motor shaft in the socketed end of the spindle and screwing up the nut 16 until the parts are firmly clamped together.

To the free end of the spindle 17 is secured a metal disc 19, which if desired may have a screw threaded connection with the spindle, and secured to said disc 19 is a felt or other pliable, circular pad 20. The polishing member 21 is removably secured to said pad 20. In its present form said polishing member is formed from a piece of sheep skin or other relatively soft pliable material and may be square in form, although not necessarily so. The disc 19 and polishing member 21 are provided with co-acting fastening members 22 such as the ordinary snap fasteners whereby the polishing member may be detachably secured to said disc. In attaching the sheep skin polishing member to the pad, the pad is placed upon the middle of the sheep skin piece and the corners of said sheep skin piece are then folded over the pad along approximately straight lines thereby forming flaps 21$^a$, which are fastened down upon the disc with the fastening members 22. It will therefore be seen that the polishing member, when secured on the pad, takes the shape of a square or other non-circular form, containing soft flexible corners that project considerably from the cylindrical face of the pad and form relatively soft pliable polishing elements, by which otherwise inaccessible parts of surfaces may be reached in polishing them.

In operation, the user grasps the handles 3, 6, closes the switch 8 thereby starting the motor 1, and lightly presses the flat face of rotating polishing member 21 against the surface of the object to be polished and moves the polishing member along the surface thereof. At otherwise inaccessible places, the edge of the polishing member may be placed against the surface to be polished and in this way corners and depressions can be reached, which would otherwise be inaccessible with a round polishing member. For shipment or storage in cartons or other containers the handle 3 may be detached from the motor, and the handle 6 may be swung down into alignment with the axis thereof, thereby reducing the greatest diameter of the device to a minimum. The device is simple, is light and is easily manipulated; because of the great speed of the polishing member the work of polishing surface is made easy and a higher polish may be obtained. It may be used in connection with polishing materials, liquid or paste. In case the polishing member becomes soiled or worn it may be readily detached from the pad and cleaned or replaced.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A polisher comprising in combination, a portable motor, a pair of handles secured thereto and projecting laterally therefrom, said handles being disposed out of alignment with each other, and one of which is angularly adjustable with respect to the longitudinal axis of the motor, means for securing said adjustable handle in various positions of adjustment, a spindle in alignment with and secured to the motor shaft of said motor and extending away from said motor and a relatively soft polishing member secured to said spindle.

2. A polisher comprising in combination, a portable motor, a pair of handles secured thereto and projecting laterally therefrom, said handles being disposed out of alignment with each other and one of which is removable and the other of which is angularly adjustable with respect to the longitudinal axis of the motor, means for securing said adjustable handle in various positions of adjustment, a spindle in alignment with and secured to the motor shaft of said motor and extending away from said motor, and a relatively soft polishing member secured to said spindle.

3. In a polisher, a motor driven spindle, a relatively soft, circular, felt pad secured to the free end of said spindle, a polygonal piece of sheep skin having its corners folded over the back of said pad, and means for securing said corners over said pad with the main portion of the sheep skin at the front of said pad to provide a polishing surface.

HARRY A. ZWEIG.